US011867356B2

(12) United States Patent
Cotton et al.

(10) Patent No.: US 11,867,356 B2
(45) Date of Patent: Jan. 9, 2024

(54) ROTARY MULTI-PORT GREASING VALVE

(71) Applicant: Patriot Research Center, LLC, Houston, TX (US)

(72) Inventors: Craig Cotton, Cypress, TX (US); Brandon Cain, Houston, TX (US)

(73) Assignee: Patriot Research Center, LLC, Houston, TX (US)

( * ) Notice: Subject to any disclaimer, the term of this patent is extended or adjusted under 35 U.S.C. 154(b) by 0 days.

(21) Appl. No.: 17/189,031

(22) Filed: Mar. 1, 2021

(65) Prior Publication Data

US 2022/0186877 A1 Jun. 16, 2022

Related U.S. Application Data

(63) Continuation-in-part of application No. 17/117,386, filed on Dec. 10, 2020.

(51) Int. Cl.
| | | |
|---|---|---|
| *F16N 25/04* | (2006.01) | |
| *F16K 11/085* | (2006.01) | |
| *F16L 39/04* | (2006.01) | |
| *F16L 39/06* | (2006.01) | |
| *F16K 5/04* | (2006.01) | |
| *F16K 11/078* | (2006.01) | |

(52) U.S. Cl.
CPC ............ *F16N 25/04* (2013.01); *F16K 11/085* (2013.01); *F16K 5/04* (2013.01); *F16K 11/078* (2013.01); *F16L 39/04* (2013.01); *F16L 39/06* (2013.01); *F16N 2280/00* (2013.01); *Y10T 137/86541* (2015.04); *Y10T 137/86549* (2015.04); *Y10T 137/86831* (2015.04)

(58) Field of Classification Search
CPC ...... F16N 2280/00; F16K 11/085; F16K 5/04; F16K 11/078; F16L 39/04; F16L 39/06; Y10T 137/86549; Y10T 137/86831; Y10T 137/86541
See application file for complete search history.

(56) References Cited

U.S. PATENT DOCUMENTS

| | | | | |
|---|---|---|---|---|
| 2,834,376 | A * | 5/1958 | Hughes | F16N 25/04 137/625.42 |
| 2,876,742 | A * | 3/1959 | Sherrill | B21J 15/18 91/32 |
| 4,270,886 | A * | 6/1981 | Skinner | F02M 59/48 417/462 |

(Continued)

*Primary Examiner* — Matthew W Jellett
*Assistant Examiner* — Christopher D Ballman
(74) *Attorney, Agent, or Firm* — Ramey LLP

(57) ABSTRACT

A rotary multiport greasing valve having an outer sleeve and an inner sleeve within the outer sleeve. The outer sleeve has at least one inlet port and at least 2 outlet ports. The inner sleeve has an inlet port, a central passageway, and an outlet port. The inner sleeves inlet port is fluidly connected to the outer sleeve's inlet port. The inner sleeve rotates within the outer sleeve so that the inner sleeves outlet port is circumferentially aligned with a selected outer sleeve outlet port creating a fluid pathway from the outer sleeve inlet port into the inner sleeve's inlet port through the central passageway through the inner sleeve's outlet port and finally through the outer sleeves outlet port to create an open flowpath. In certain instances, the inner sleeve inlet port is longitudinally shifted so as not to align with any portion of an outlet sleeve outlet port.

1 Claim, 12 Drawing Sheets

(56) References Cited

U.S. PATENT DOCUMENTS

| | | | | |
|---|---|---|---|---|
| 4,302,019 A * | 11/1981 | Hotger | F16L 39/04 | 277/417 |
| 5,110,159 A * | 5/1992 | Herold | F16L 39/04 | 285/121.5 |
| 5,529,347 A * | 6/1996 | Lee | B66C 23/84 | 285/190 |
| 5,881,770 A * | 3/1999 | Neill | F16K 11/0743 | 251/297 |
| 6,119,726 A * | 9/2000 | Cox | F16K 11/078 | 137/239 |
| 6,843,466 B1 * | 1/2005 | Chuang | F16K 11/076 | 251/207 |
| 7,152,627 B2 * | 12/2006 | Danley | B62D 5/0837 | 91/375 A |
| 7,322,375 B2 * | 1/2008 | Goldfarb | F16K 11/085 | 137/625.22 |
| 9,279,506 B2 * | 3/2016 | Jensen | F16K 11/074 | |
| 9,297,470 B2 * | 3/2016 | Hodnefjell | E21B 33/037 | |
| 9,708,168 B2 * | 7/2017 | Knieling | F16L 58/08 | |
| 9,732,861 B2 * | 8/2017 | Maier | F16K 11/0716 | |
| 10,072,795 B2 * | 9/2018 | Dlouhy | B66B 31/00 | |
| 10,088,089 B2 * | 10/2018 | Kikuyama | F16L 39/04 | |
| 10,655,741 B2 * | 5/2020 | Suzuki | F16K 11/085 | |
| 10,919,750 B2 * | 2/2021 | Carpino | B65B 3/12 | |
| 11,274,782 B2 * | 3/2022 | Petrou | F16L 39/04 | |
| 2008/0302994 A1 * | 12/2008 | Syzkulski | F16K 11/0856 | 251/345 |
| 2012/0160328 A1 * | 6/2012 | Vivatson | F16L 39/04 | 137/625.42 |
| 2016/0258564 A1 * | 9/2016 | Fukumoto | F16J 15/3484 | |
| 2018/0022331 A1 * | 1/2018 | Bruett | F16K 31/041 | 137/511 |

\* cited by examiner

ROTARY MULTI-PORT GREASING VALVE

CROSS-REFERENCE TO RELATED APPLICATIONS

This application claims priority to U.S. patent application Ser. No. 17/117,386 filed on Dec. 10, 2020.

BACKGROUND

A typical oil and gas well generally includes a wellhead with a frack tree at the surface. The frack tree, in turn, generally consists of one or more large bore gate valves that allow pumping high-pressure fluids, including proppant, into the wellbore. High-pressure fluid, when injected into a hydrocarbon bearing formation, causes fissures in the formation rock that radiate out from the wellbore. However, when the high-pressure fluid is removed the fissures close. When proppant, generally sand, is injected into the formation along with the high-pressure fluid then as the fissures are formed, proppant is also forced into the fissures. When the pressure is removed from the fluid within the fissures, the proppant remains within the fissures. Generally, the proppant has a relatively small diameter in order to be carried into the fissures and has a relatively high compressive strength such that when the pressure is removed the proppant that remains within the fissures prevents the fissures from closing. The fissures are then able to provide channels for fluids to move from the formation into the wellbore. Material such as sand and ground walnut shells are commonly used.

Today a single well may see 40 or more pumping cycles in order to fracture each hydrocarbon bearing formation within the well. A typical frack job may require over 10 million barrels of water and several hundred thousand pounds of proppant. During the frack job, all valves that are downstream of the frack pumps such as the frack tree valves, as well as other devices having gate valves such as the zipper manifolds are set to full flow to allow the high pressure frack fluid to move through the valves. While the operator is pumping the high-pressure frack fluid, on the order of 12,000 to 15,000 psi, the sand laden fluid is forced into every small opening from the top of the frack tree to the bottom of the well including any nooks or crannies in the large bore valves that make up the frack tree.

Generally, the large bore valves are gate valves. Each of the gates sits between a pair of seats. When the gate transits between an open and closed position the gate floats between each of the seats. When a gate is closed pressurized fluid will push against the gate causing the gate to land on the seat on the opposite side of the pressurized fluid. When the gate lands on the seat a seal is formed to prevent fluid flow past the gate and seat. However, on the side of the gate towards the fluid there is a gap between the seat and the gate. This gap allows pressurized fluid to flow around the gate and into the space where the gate moves when it's open. The pressurized fluid is generally proppant laden therefore the proppant moves with the fluid into the space behind the gate. When enough proppant moves into the space behind the gate, the gate is no longer operable as there is no room behind the gate for the gate to move off the seat and into its open position. Additionally, in many instances the proppant, which is usually sand, is highly abrasive and a small amount of the abrasive proppant will remain on the fluid side of the gate between the gate in the seat such that when the gate slides open the abrasive proppant drags across the gate and the seat causing scratches and abrasions into the surface of both the gate and the seat which in turn degrades the valves ability to seal. Therefore, in order to keep the valves operable as long as possible, every so often the frack operation is shut down and the valve is closed. Once the frack operation is stopped grease is applied to the valve in an effort to push the proppant out of the valves' nooks and crannies and in particular the area behind the gate. Generally, the grease very viscous and is also used in an attempt to seal the gates in order to prevent leaking allowing a proppant damaged valve to continue to operate at some degraded capacity until it reaches a point at which it must be replaced.

Current multiport greasing systems generally require a manifold to split and control the grease as the grease is directed toward the various valves including the gate valves. Further, the current multiport greasing systems require multiple grease valves downstream of the manifold to isolate the individual frack and/or gate valves from the manifold ports. For instance, a manifold having 6 outlet ports will have 5 of the grease valves downstream of the manifold outlet ports set to prevent grease flow past the valve thereby blocking grease flow through a manifold outlet port so that only 1 of the manifold outlet ports is set to provide grease flow past the valve and to an individual frack and/or gate valve. The manifold together with its individual valves and valve actuating mechanisms at each outlet port is bulky, complicated, and relatively expensive to maintain.

SUMMARY

In an embodiment of the current invention a rotary multiport valve is provided. The rotary multiport valve simplifies directing grease to the various frack and/or gate valves by eliminating the manifold, currently required in a multiport greasing system, completely. Additionally, the number of downstream grease valves along with their individual actuating mechanisms is reduced to a single unit. So that a current multiport greasing system manifold having 6 outlet ports and thereby 6 greasing valves and 6 actuating mechanisms for each of the greasing valves may be reduced to a single rotary multiport valve and a single actuating mechanism. The rotary multiport valve increases the reliability of a multiport greasing system by having fewer points of failure as compared to a traditional manifold with grease valves and individual actuating mechanisms by eliminating the various valves and actuating mechanisms.

In ordinary operation, the rotary multiport valve includes an outer sleeve having an inlet port and at least 2 outlet ports, an inner sleeve that is able to rotate within the outer sleeve having an inlet port and an outlet port. In some instances the outer sleeve's inlet port is coaxial with the inner sleeve's inlet port. In other instances the outer sleeve's inlet port may be offset from the inner sleeve's axially aligned inlet port. While an even other instances both the outer sleeve's inlet port and the inner sleeve's inlet port may be offset from the centerline of the inner sleeve. In such instances a fluid pathway is provided to route the fluid from the inlet port to a location along the centerline of the inner sleeve of the rotary multiport valve. The inner sleeve is allowed to rotate within the outer sleeve such that an outlet port on the inner sleeve periodically aligns with the outlet port on the outer sleeve. When the inner sleeve outlet port and the outer sleeve outlet ports are aligned a flowpath is provided so that fluid, or in this case grease, may enter the outer sleeve's inlet port flow through the outer sleeve to the inner sleeve. The fluid may then flow into the inner sleeve, generally along the centerline of the inner sleeve, and is then directed radially outward to an outlet port, generally on the outer periphery of the inner sleeve or the fluid may pass through an outlet port of the outer sleeve. Generally, when the inner sleeve outlet port is at least partially aligned with an outer sleeve outlet port the rotary multiport valve may be considered open and when the inner sleeve outlet port is not aligned, even partially, within outer sleeve outlet port the rotary multiport valve may be considered closed.

In certain instances the inner sleeve may shift upwards or downwards along the centerline of the inner sleeve. By shifting the inner sleeve upwards or downwards the outer sleeve outlet ports may be more closely spaced such that were the inner sleeve to be merely rotated from a $1^{st}$ outer sleeve outlet port to a $2^{nd}$ outer sleeve outlet port the inner sleeve outlet port could overlap both the $1^{st}$ outer sleeve outlet port and the $2^{nd}$ outer sleeve outlet port so that the rotary multiport valve would not have a closed position. By allowing the inner sleeve to shift upwards or downwards the inner sleeve may be moved out of alignment with both the $1^{st}$ outer sleeve outlet port and the $2^{nd}$ outer sleeve outlet port and thus be considered closed. Additionally, shifting the inner sleeve upwards or downwards and allowing the inner sleeve to be rotated while shifted various ports on the outer sleeve may be selected without having to open an intervening port. For instance, a rotary multiport valve having a $1^{st}$, a $2^{nd}$, $3^{rd}$, and $4^{th}$ outlet port on the outer sleeve may have the inner sleeve rotated to open a fluid pathway through the $1^{st}$ port. At some point the $1^{st}$ port is closed by shifting the inner sleeve upwards. The inner sleeve is then rotated within the outer sleeve, while remaining shifted upwards or downwards, past the $2^{nd}$ port to the $3^{rd}$ port where the inner sleeve is then shifted upwards or downwards such that the inner sleeve outlet port and the outer sleeve $3^{rd}$ port are in alignment to open a fluid path through the rotary multiport valve from the inlet port through the $3^{rd}$ outlet port.

In certain instances, it may be beneficial to stack rotary multiport valves. For instance, a rotary multiport valve may be limited to 2 or 3 outlets in the outer sleeve. In such a case the inner sleeve may be rotated from its alignment with a particular outlet to either of the remaining outlets as desired without shifting upwards, downwards, or through an undesired outlet. Such a valve, that does not include the ability to shift longitudinally along the centerline of the inner sleeve may be more robust than a rotary multiport valve that includes the ability to ship longitudinally along the centerline of the inner sleeve. For example, in order to provide the ability to select any desired port without shifting a $1^{st}$ rotary multiport valve having 3 outlet ports is installed within the potential fluid pathways. Then a $2^{nd}$, $3^{rd}$, and $4^{th}$ rotary multiport valves each also having 3 outlet ports are installed such that the $1^{st}$, $2^{nd}$, and $3^{rd}$ outlet ports on the $1^{st}$ rotary multiport valve are connected such that the $1^{st}$ outlet port on the $1^{st}$ rotary multiport valve is connected to the inlet port on the $2^{nd}$ rotary multiport valve, the $2^{nd}$ outlet port on the $1^{st}$ rotary multiport valve is connected to the inlet port on the $3^{rd}$ rotary multiport valve, and the $3^{rd}$ outlet port on the $1^{st}$ rotary multiport valve is connected to the inlet port on the $4^{th}$ rotary multiport valve. Such an arrangement allows an operator to select between any one of the 9 available outlet ports on either the $2^{nd}$, $3^{rd}$, or $4^{th}$ rotary multiport valves.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
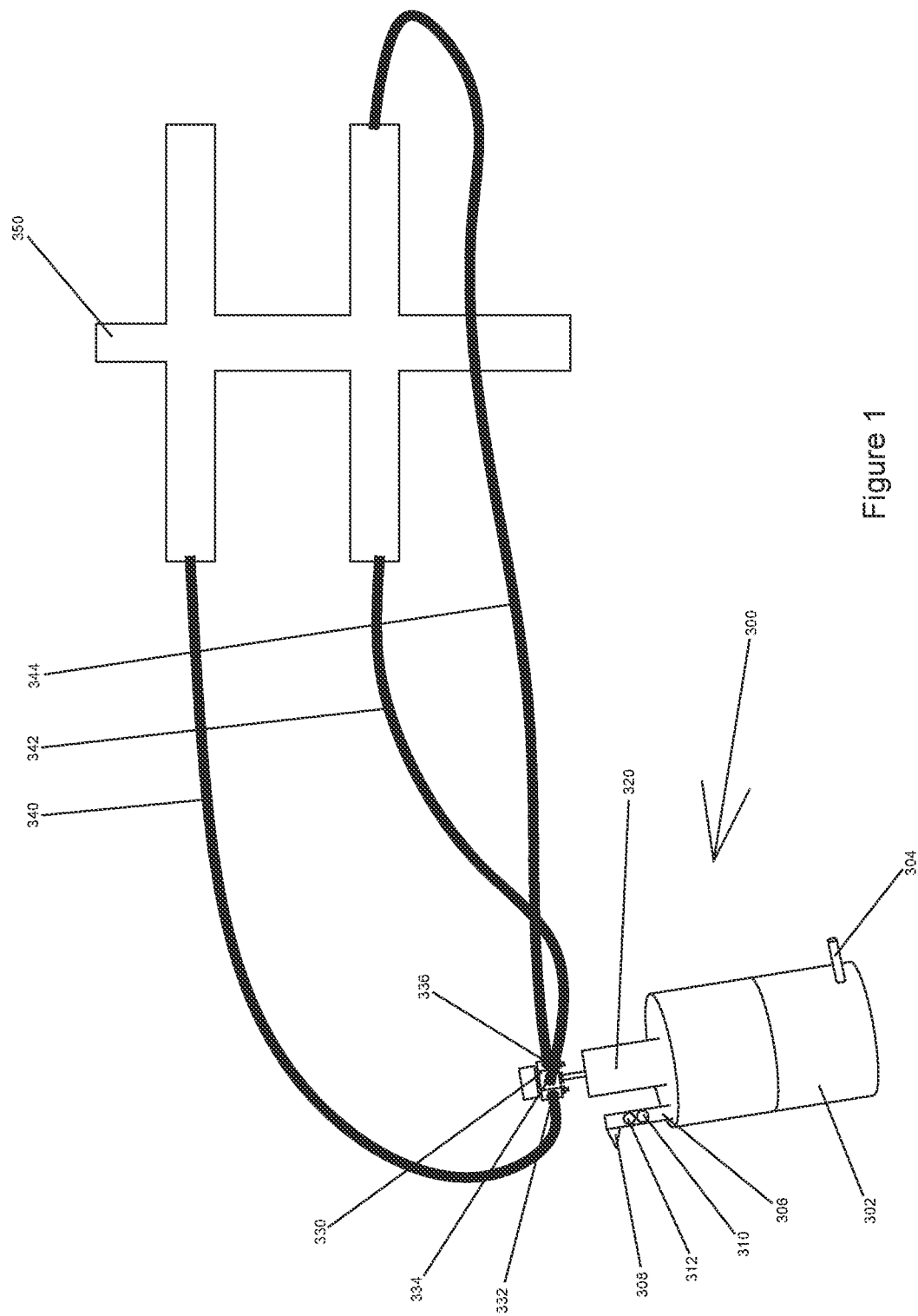
FIG. 1 depicts a pod connected to various greasing points on a wellhead.

FIG. 1 depicts a pod 300 connected to various greasing points, usually for each frack valve, on a wellhead. The pod 300 includes a storage tank 302. The storage tank 302 has an inlet 304 that is attached to any of the low-pressure grease supply lines. The storage tank 302 also includes a grease level indicator 306. In some instances, the grease level indicator may display lights 310 and or a mechanical indicator such as a flag 312 where a raised or visible flag may indicate a low grease level within the storage tank 302 and where a light or combination of lights that may be on or off or display various colors when illuminated to indicate the grease level within storage tank 302. The storage tank 302 is typically adjacent to the high-pressure grease pump 320 and supplies grease to high-pressure grease pump 320. An air supply line from the supply source (not shown) is also connected to high-pressure grease pump 320 and supplies the power to operate the high-pressure grease pump 320. The high-pressure grease pump 320 then supplies the grease from storage tank 302 at high-pressure, where the grease pressure from the high-pressure grease pump 320 is at least sufficient to overcome the pressure within the frack valve during fracking and in some instances to up to 15,000 psi, to grease distributor 330. Grease distributor also referred to as a rotary multiport valve 330 has an input and at least 2 outputs. In this case grease distributor 330 has output 332, 334, and 336. Each of the outputs 332, 334, and 336 may be connected to a high-pressure, capable of withstanding up to 15,000 psi, grease distribution hose, such as hose 340, 342, and 344. One or more of the outputs may be blocked and do not provide a connection to the wellhead 350.

Figure 2:
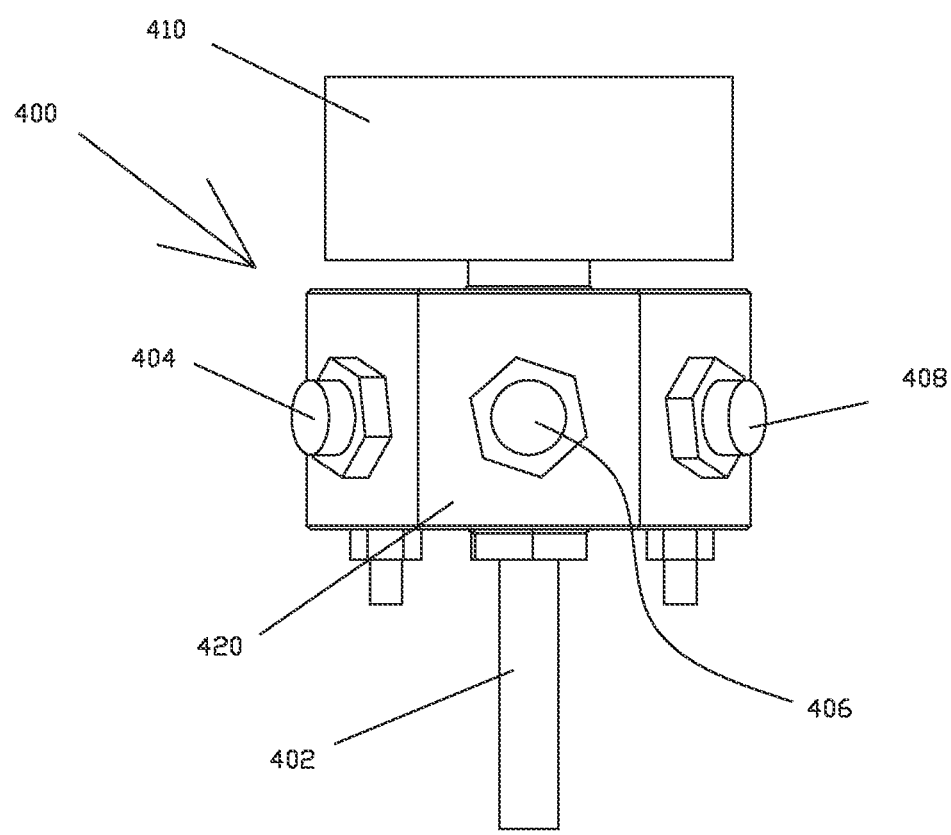
FIG. 2 is a side view of a grease distributor.
Figure 3:
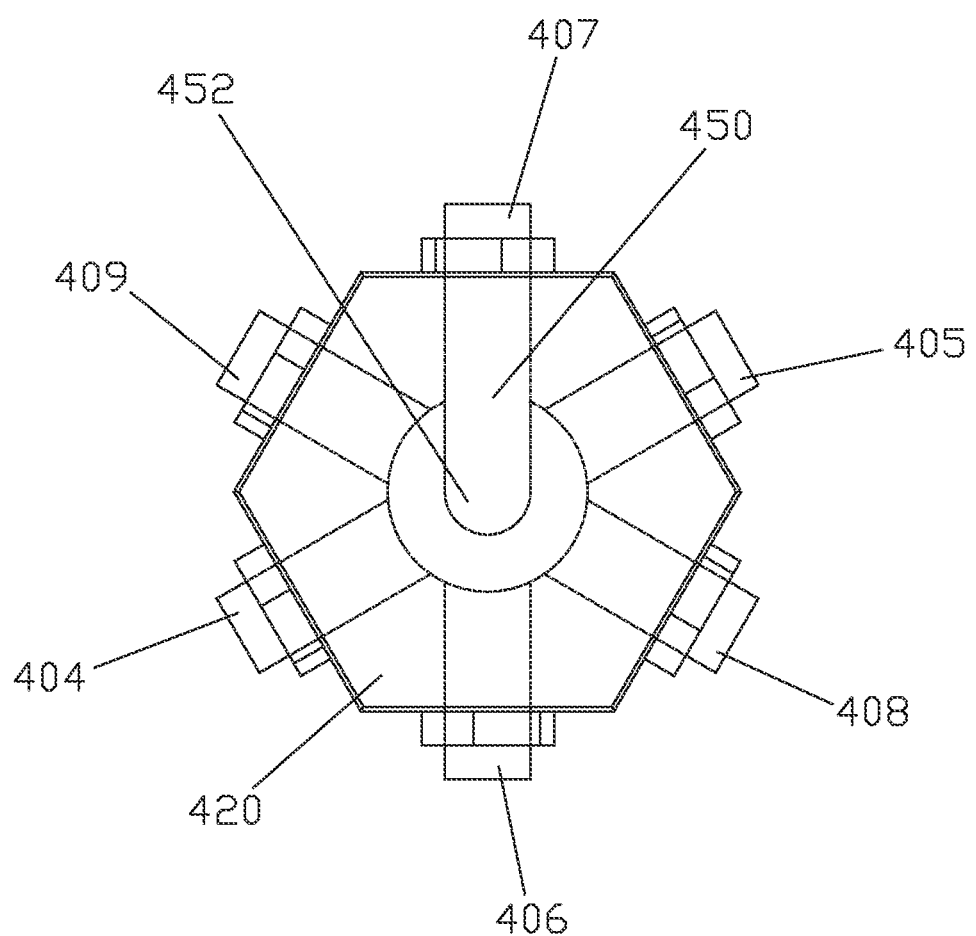
FIG. 3 is a top view of the grease distributor.

FIG. 2 is a side view of a grease distributor 400 while FIG. 3 is a top view of the grease distributor 400. The grease distributor 400 includes an input 402 that receives high-pressure grease from the high-pressure grease pump. The high-pressure grease then flows into the interior of grease distributor 400 where a movable flowpath 450 directs the grease to any one of the outputs such as output 404, 406, or 408. The movable flowpath 450 receives the grease from input 402 and is then rotated by a motor such as air-driven motor 410 to align the movable flowpath output 452 with any of the outputs 404-409. In the event that no output is desired or access to an output that is not adjacent to the previously supplied output the movable flowpath 450 may be raised or lowered within a bore within housing 420 such that housing 420 blocks the grease flowpath for as long as desired by the operator or during the movable flowpath's 450 rotation from a first flowpath to a second flowpath or non-adjacent flowpath.

Figure 4:
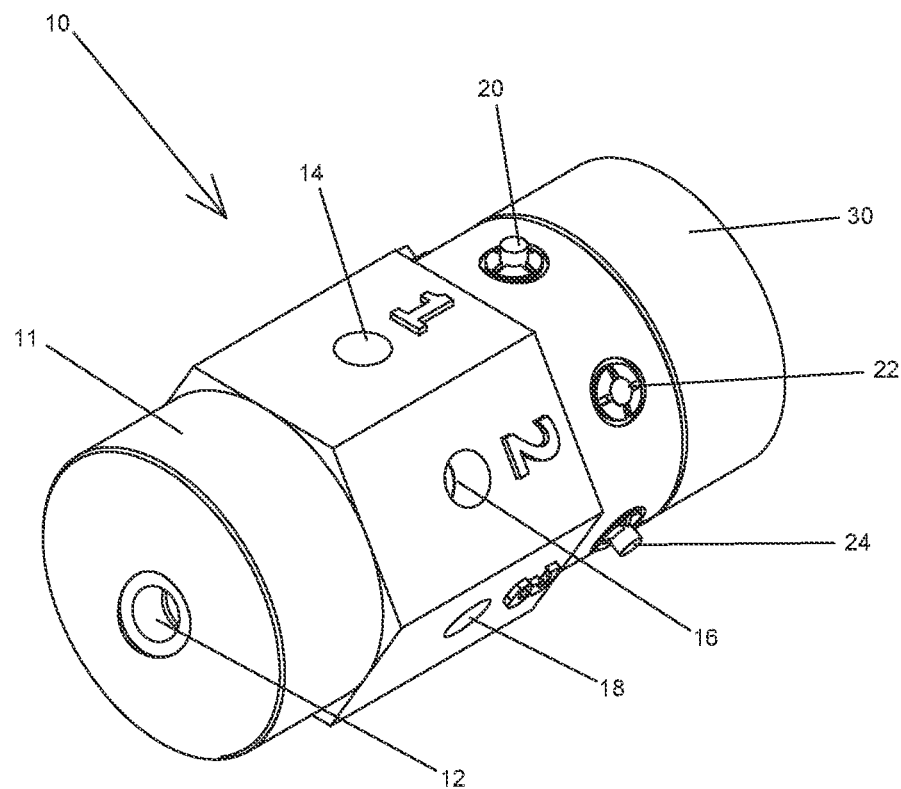
FIG. 4 is an orthographic view of an alternate embodiment of a rotary multiport valve.

FIG. 4 is an orthographic view of an alternate embodiment of a rotary multiport valve 10 having an outer sleeve 11, an outer sleeve inlet port 12, a $1^{st}$ outer sleeve outlet port 14, a $2^{nd}$ outer sleeve outlet port 16, and $3^{rd}$ outer sleeve outlet port 18. The outer sleeve 11 has 3 additional outlet ports that are not shown. Additionally, the outer sleeve 11 has a $1^{st}$ indicator 20, a $2^{nd}$ indicator 22, and a $3^{rd}$ indicator 24. The outer sleeve 11 has 3 additional indicators that are not shown. At the distal end of the outer sleeve 11 is rotary actuator 30. Rotary actuator 30 may be pneumatic, hydraulic, or electric.

When in use, a fluid supply line is attached to outer sleeve inlet port 12 so that the fluid is able to flow into the interior of the rotary multiport valve 10 where it is then directed to at least one of the outlet ports such as outer sleeve outlet ports 14, 16, or 18. Depending upon which outlet port 14, 16, or 18 the fluid is directed the indicator associated with the outlet port to which the fluid is directed will be actuated. In this case fluid is directed from outer sleeve inlet port 12 through the interior of the rotary multiport valve 10 to outlet port 16. Therefore, indicator 22 is actuated in this instance indicator 22 is retracted radially inward. In some cases the indicator 22 may be extended or may be a light, colored or otherwise. In some cases the indicator 22 may be an electrical switch that operates in conjunction with a mechanical or light indicator.

Figure 5:
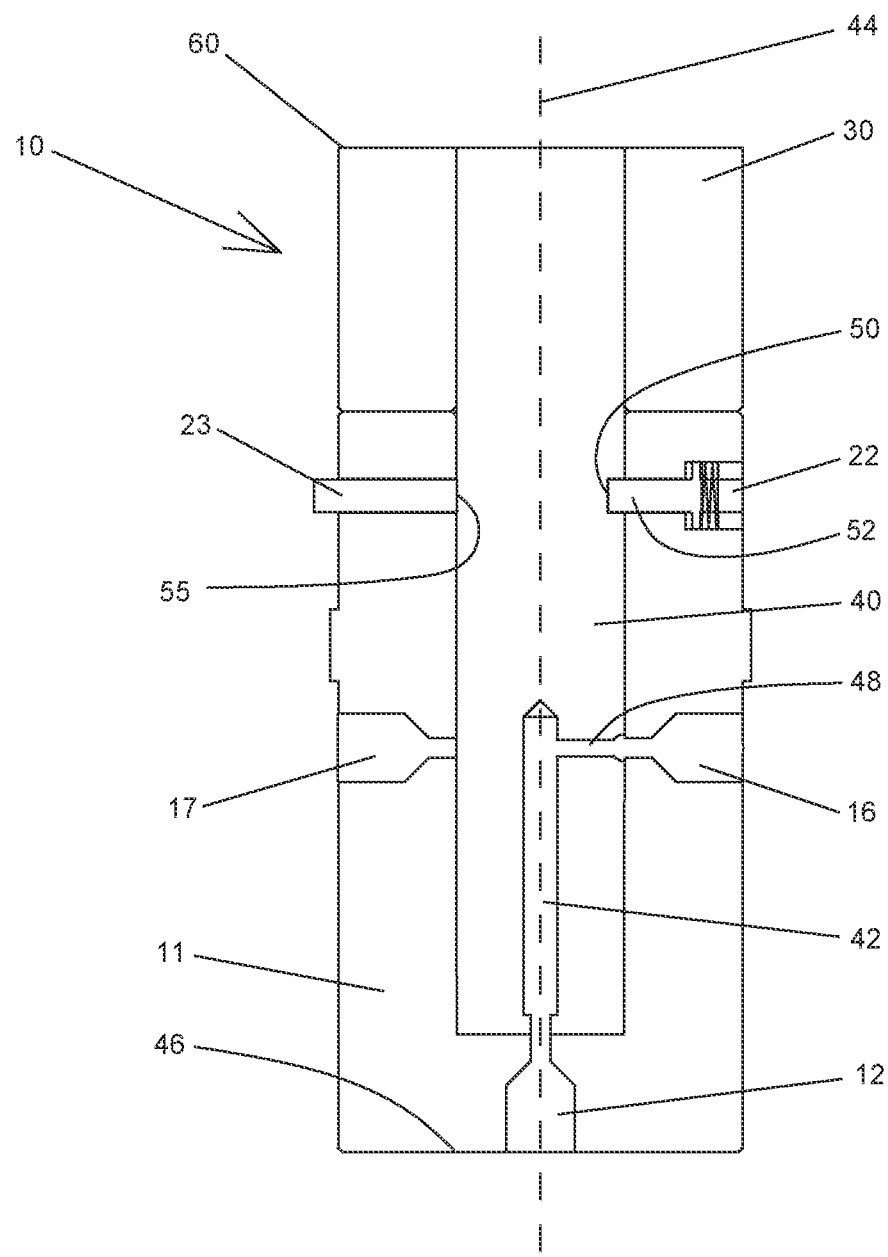
FIG. 5 is a side cutaway view of rotary multiport valve.

FIG. 5 is a side cutaway view of rotary multiport valve 10. The outer sleeve 11 includes outer sleeve inlet port 12, outer sleeve outlet port 16, and in this case the radially opposed outer sleeve outlet port 17. Within the outer sleeve 11 is inner sleeve 40. Inner sleeve 40 includes a flowpath 42 that is axially aligned with the centerline 44 of inner sleeve 40 and in this case is also in coaxial alignment with the centerline of outer sleeve 11. In certain instances, the centerline of outer sleeve 11 and the centerline of outer sleeve 40 may not be coaxial. At the lower end 46 of inner sleeve 40, flowpath 42 is aligned with the flowpath of outer sleeve inlet port 12. At some point along the length of flowpath 42 is radial flowpath Radial flowpath 48 is longitudinally aligned with the flowpaths of the outer sleeve outlet ports such as outer sleeve outlet ports 16 and 17. However radial flowpath 48 is only circumferentially aligned with the desired flowpath associated with an outer sleeve outlet port such as outer sleeve outlet ports 16 and 17. In this case flowpaths 48 and the flowpath of outer sleeve outlet port 16 are aligned while a flow path between inner sleeve flowpath 42 and outer sleeve outlet port 17 is blocked or closed. In certain instances, inner sleeve 40 may have multiple radial flow paths formed within inner sleeve 40 so that 2 or more outer sleeve outlet ports may be accessed at the same time.

Additionally, outer sleeve 11 includes indicators such as indicators 22 and 23. Inner sleeve 40 in this case includes recess 50. Recess 50 is circumferentially aligned with fluid flow path 48 such that when fluid flow path 48 is aligned with the fluid flowpath of outer sleeve outlet port 16 the radially inward portion 52 of indicator 22 is pushed radially inward into recess 50 within inner sleeve 40 by bias device 54. In this case bias device 54 is a spring however bias device 54 may be anything known in the industry that will apply sufficient force in the radially inward direction to cause indicator 22 to move radially inward into recess 50. At the same time indicator 23 is held radially outward by the outer surface of inner sleeve 40 until such time as recess 50 rotates into alignment with the radially inward end 55 of indicator 23. At the upper end 60 of the outer sleeve 11 is rotary actuator 30. Rotary actuator 30 is generally held rigidly with respect to outer sleeve 11 and applies torque to inner sleeve 40 in order to rotate inner sleeve 40 within outer sleeve 11.

Figure 6:
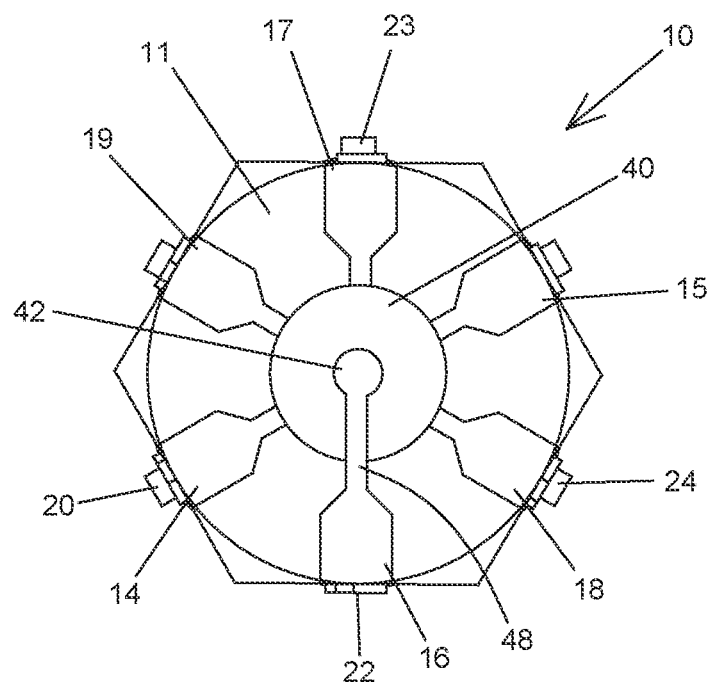
FIG. 6 is a cutaway view of the rotary multiport valve viewed from the upper end of the rotary multiport valve having an aligned fluid pathway.
Figure 7:
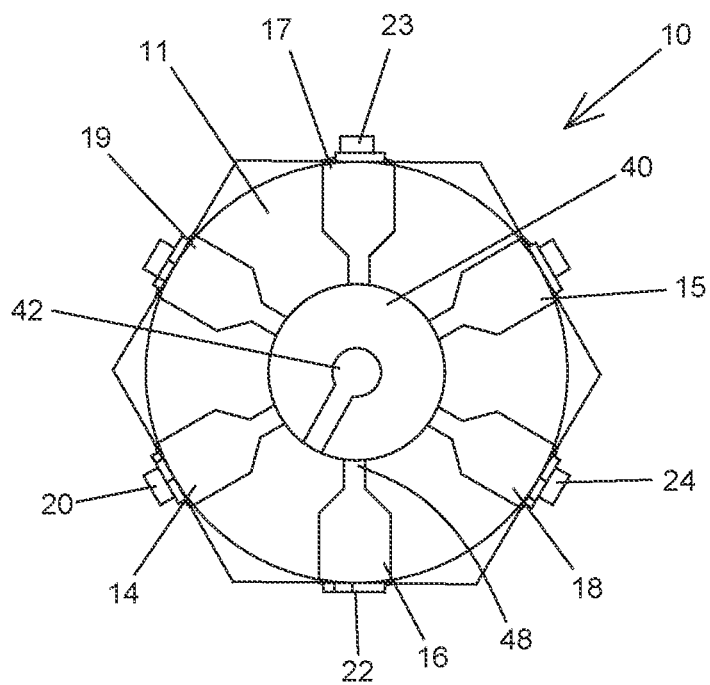
FIG. 7 is a cutaway view of the rotary multiport valve viewed from the upper end of the rotary multiport valve having a non-aligned fluid pathway.

FIG. 6 is a cutaway view of the rotary multiport valve 10 from the upper end 60 of the rotary multiport valve 10. The outer sleeve 11 includes at least outlet ports 14, 16, and 18. Within the outer sleeve 11 is inner sleeve 40 inner sleeve 40 includes a coaxial fluid pathway 42 and intersecting coaxial fluid pathway 42 is fluid pathway 48 directed radially outward from fluid pathway 42. The inner sleeve 40 is able to rotate within outer sleeve 11. As shown in FIG. 6 fluid pathway 48 has been rotated within outer sleeve 11 such that fluid pathway 48 is aligned with outer port 16 in outer sleeve 11. When the fluid pathway 48 is aligned with the outer ports, such as outer port 14, 15, 16, 17, 18, or 19 the rotary multiport valve 10 is open with regard to the outer port with which the fluid pathway 48 is aligned. In certain instances, such as shown in FIG. 7 fluid pathway 48 is not aligned with any of the outer ports, such as outer ports 14, 16, or 18 such that the rotary multiport valve 10 is considered closed.

Figure 8:
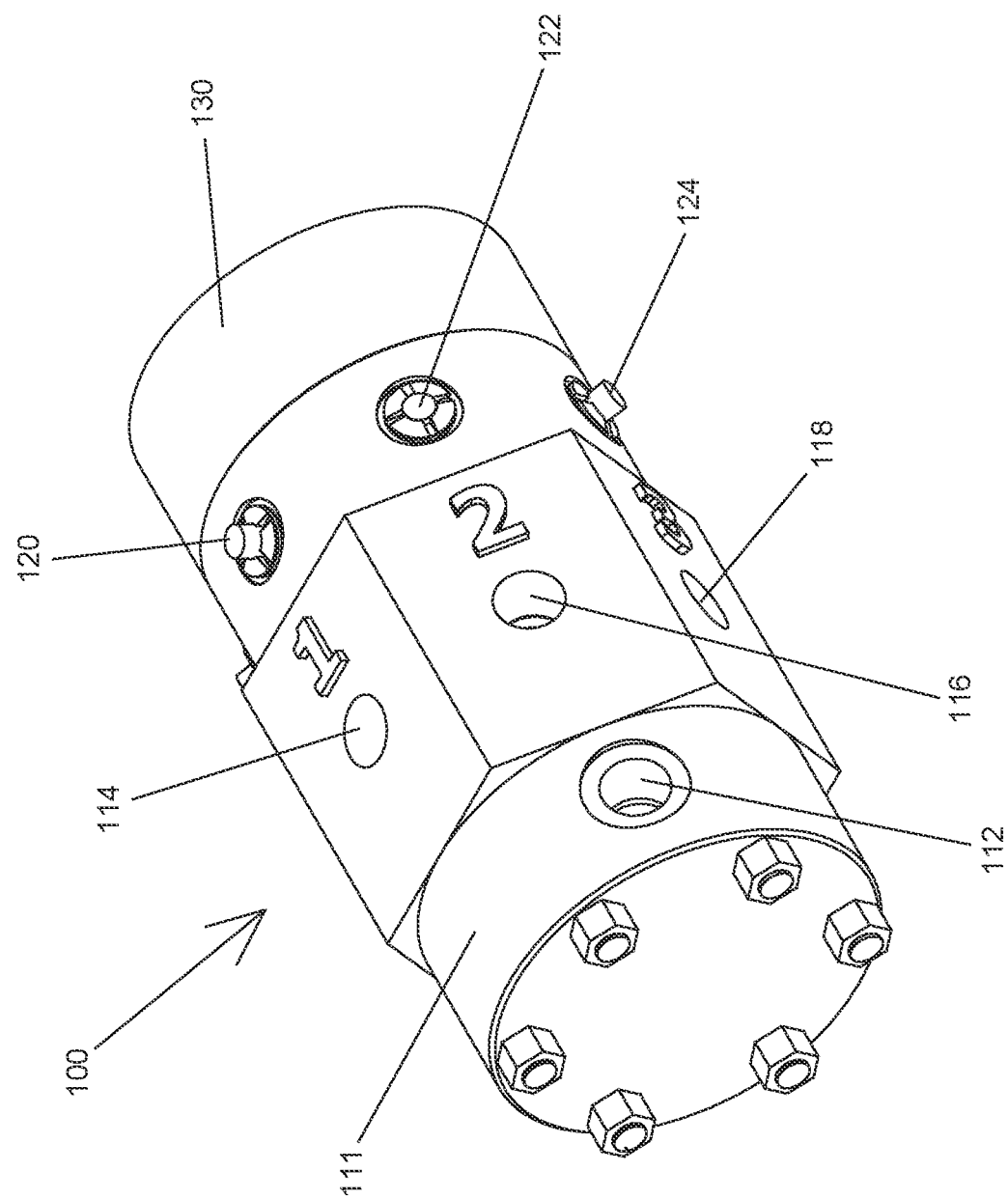
FIG. 8 is an orthographic view of an alternative arrangement of the invention.

FIG. 8 is an orthographic view of an alternative arrangement of the invention. Rotary multiport valve 100 has an outer sleeve 111, an outer sleeve inlet port 112, a $1^{st}$ outer sleeve outlet port 114, a $2^{nd}$ outer sleeve outlet port 116, and $3^{rd}$ outer sleeve outlet port 118. The outer sleeve 111 has 3 additional outlet ports that are not shown. Additionally, the outer sleeve 111 has a $1^{st}$ indicator 120, a $2^{nd}$ indicator 122, and a $3^{rd}$ indicator 124. The outer sleeve 111 has 3 additional indicators that are not shown. At the distal end of the outer sleeve 111 is rotary actuator 130.

When in use, a fluid supply line is attached to outer sleeve inlet port 112 so that the fluid is able to flow into the interior of the rotary multiport valve 110 where it is then directed to at least one of the outlet ports such as outer sleeve outlet ports 114, 116, or 118. Depending upon which outlet port 114, 116, or 118 the fluid is directed the indicator associated with the outlet port to which the fluid is directed will be actuated. In this case fluid is directed from outer sleeve inlet port 112 through the interior of the rotary multiport valve 110 to outlet port 16. Therefore, indicator 122 is actuated and in this instance indicator 122 is retracted radially inward in other cases the indicated may be retracted and only the active indicator is extended.

Figure 9:
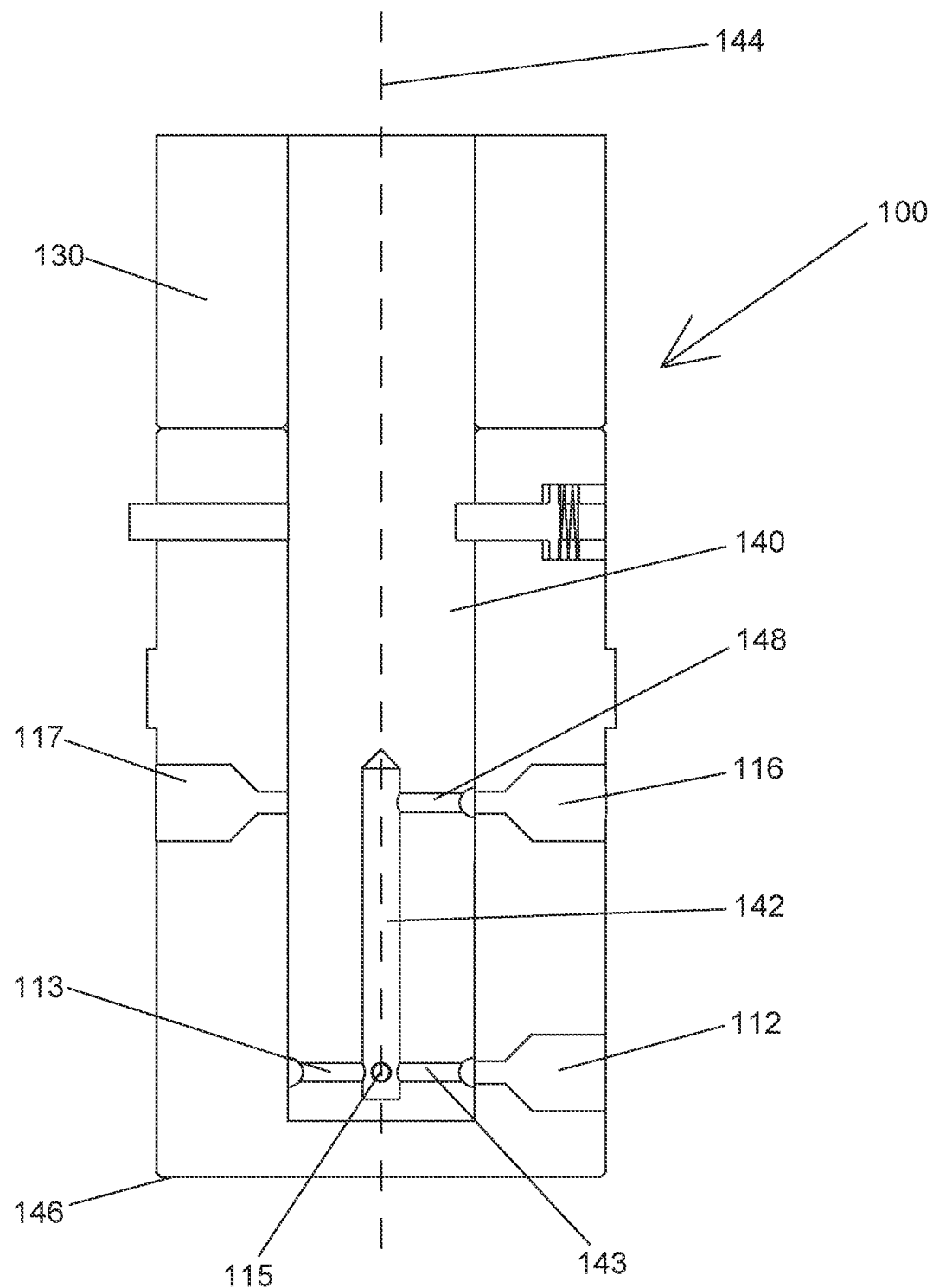
FIG. 9 is a side cutaway view of a rotary multiport valve.

FIG. 9 is a side cutaway view of rotary multiport valve 100. The outer sleeve 111 includes outer sleeve inlet port 112 outer sleeve outlet port 116 and in this case the radially opposed outer sleeve inlet port 117. Within the outer sleeve 111 is inner sleeve 140. Inner sleeve 140 includes a flowpath 142 that is axially aligned with the centerline 144 of inner sleeve 140 and in this case is also in coaxial alignment centerline of outer sleeve 111. In certain instances, the centerline of outer sleeve 111 and the centerline of outer sleeve 140 may not be coaxial. At the lower end 146 of inner sleeve 140 is flowpath 142. At some point along the length of flowpath 142 is radial flowpath 148. Radial flowpath 148 is longitudinally aligned with the flowpath's of the outer sleeve outlet ports such as outer sleeve outlet ports 116 and 117. However radial flowpath 148 is only circumferentially aligned with the desired flowpath associated with an outer sleeve outlet port such as outer sleeve outlet ports 116 and 117. In this case flowpaths 148 and the flowpath of outer sleeve outlet port 116 are aligned while a flow path between inner sleeve flowpath 142 and outer sleeve outlet port 117 is blocked or closed. In certain instances, inner sleeve 40 may have multiple radial flow paths formed within inner sleeve 40 so that 2 or more outer sleeve outlet ports may be accessed at the same time. Inner sleeve flowpath 142 also includes radial flowpath 143. Radial flowpath 143 is longitudinally aligned with outer sleeve inlet port 112 when radial flowpath 148 is aligned with outer sleeve outlet port 116. A complete fluid circuit is created from outer sleeve inlet port 112 through radial flowpath 143, through flowpath 142, through radial flowpath 148, and to outer sleeve outlet port 116 when radial flowpath's 143 and 148 are aligned with the outer sleeve inlet 112 and the outer sleeve outlet 116. Additional radial flowpaths, including at least radial flowpath's 113 and 115, are provided so that as radial flowpath 148 may align with outer sleeve outlet 117, radial flowpath 113 is provided to allow fluid access between outer sleeve inlet port 112 and fluid flow path 142 and thus to radial flowpath 148 and outer sleeve outlet port 117.

Figure 10:
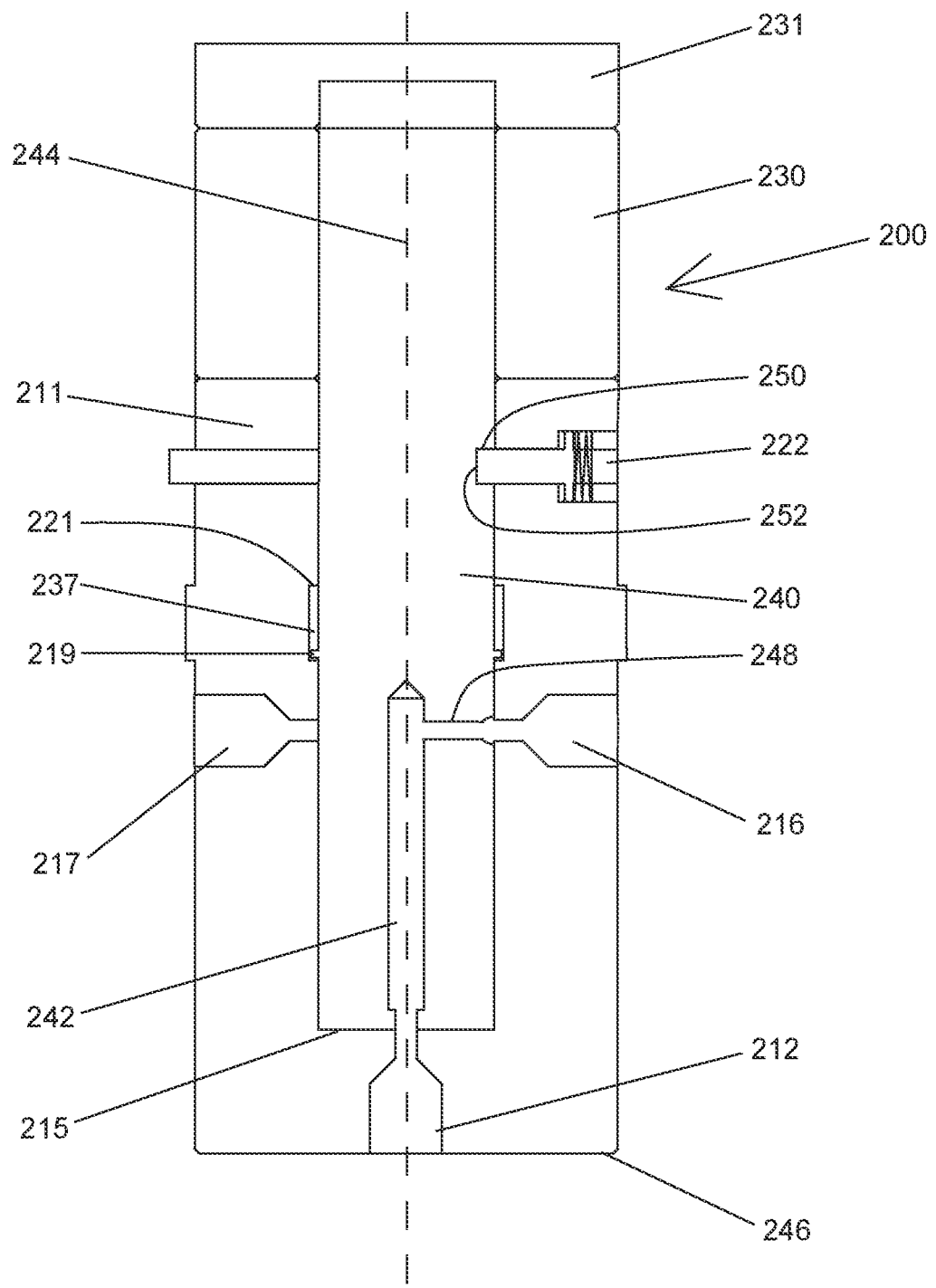
FIG. 10 is a side view of an alternative arrangement of the invention having an axially movable inner sleeve.

FIG. 10 is a side view of an alternative arrangement of the invention. The rotary multiport valve 200 has an outer sleeve 211 which includes outer sleeve inlet port 212, outer sleeve outlet port 216, and in this case the radially opposed outer sleeve inlet port 217. The outer sleeve 211 includes cavity 215. Within the cavity 215 of the outer sleeve 211 is inner sleeve 240. The inner sleeve 240 may rotate circumferentially within the cavity 215. Generally, motor 230 provides the circumferential force to rotate inner sleeve 240 within the outer sleeve 211. Outer sleeve 211 also has recess 237 within the interior of outer sleeve 211. The inner sleeve 240 includes a lug 219 that may be circumferential. The inner sleeve 240 may move longitudinally within the outer sleeve 211. The inner sleeve 240, in this case, is restrained by lug 219 reaching the upper shoulder 221 of cavity 237. In an embodiment of the invention the inner sleeve 240 is free to move longitudinally within motor 230. A linear actuator 231, which may be hydraulic, pneumatic, or electric, provides axial force to move sleeve 240 within both motor 230 and outer sleeve 211. Inner sleeve 240 includes a flowpath 242 that may be axially aligned with the centerline 244 of inner sleeve 240. The rotary multiport valve 200 has a lower end 246. At the lower end of inner sleeve 240, flowpath 242 is aligned with the flowpath of outer sleeve inlet port 212, although the outer sleeve inlet port 212 does not necessarily require alignment with the centerline of the inner sleeve 240 or with flowpath 242 as long as a flowpath exists between outer sleeve inlet port 212 and the inner sleeve flowpath 242. At some point along the length of flowpath 242 is radial flowpath 248. Radial flowpath 248 may be longitudinally aligned with the flowpaths of the outer sleeve outlet ports such as outer sleeve outlet ports 216 and 217 by linear actuator 231. While radial flowpath 248 may be circumferentially aligned as desired and longitudinally aligned within the travel limits of the inner sleeve 240 within the outer sleeve 211, in this instance radial flowpath 248 is circumferentially aligned with the desired flowpath associated with the outer sleeve outlet port 216. In this case flowpaths 248 and the flowpath of outer sleeve outlet port 216 are aligned while a flow path between inner sleeve flowpath 242 and outer sleeve outlet port 217 is blocked or closed.

As depicted in FIG. 10, outer sleeve 211 includes indicators such as indicators 222 and 223. Inner sleeve 240 in this case includes recess 250. Recess 250 is circumferentially aligned with fluid flow path 248 such that when fluid flow path 248 is aligned with the fluid flowpath of outer sleeve outlet port 216 the radially inward portion 252 of indicator 222 is pushed radially inward into recess 250 within inner sleeve 240 by bias device 254. At the same time indicator 223 is held radially outward by the outer surface of inner sleeve 240 until such time as recess 250 rotates into alignment with the radially inward end 255 of indicator 223. At the upper end 260 of the outer sleeve 211 is rotary actuator 230. Rotary actuator 230 is generally held rigidly with respect to outer sleeve 211 and applies torque to inner sleeve 240 in order to rotate inner sleeve 240 within outer sleeve 211. Additionally, a linear actuator 231 is located adjacent to rotary actuator 230. Inner sleeve 240 is free to move longitudinally within rotary actuator 230 in order to allow linear actuator 231 to shift the inner sleeve 240 from an open position shown in FIG. 6 to a closed position that is longitudinally offset from outlet ports 216 and 217.

Figure 11:
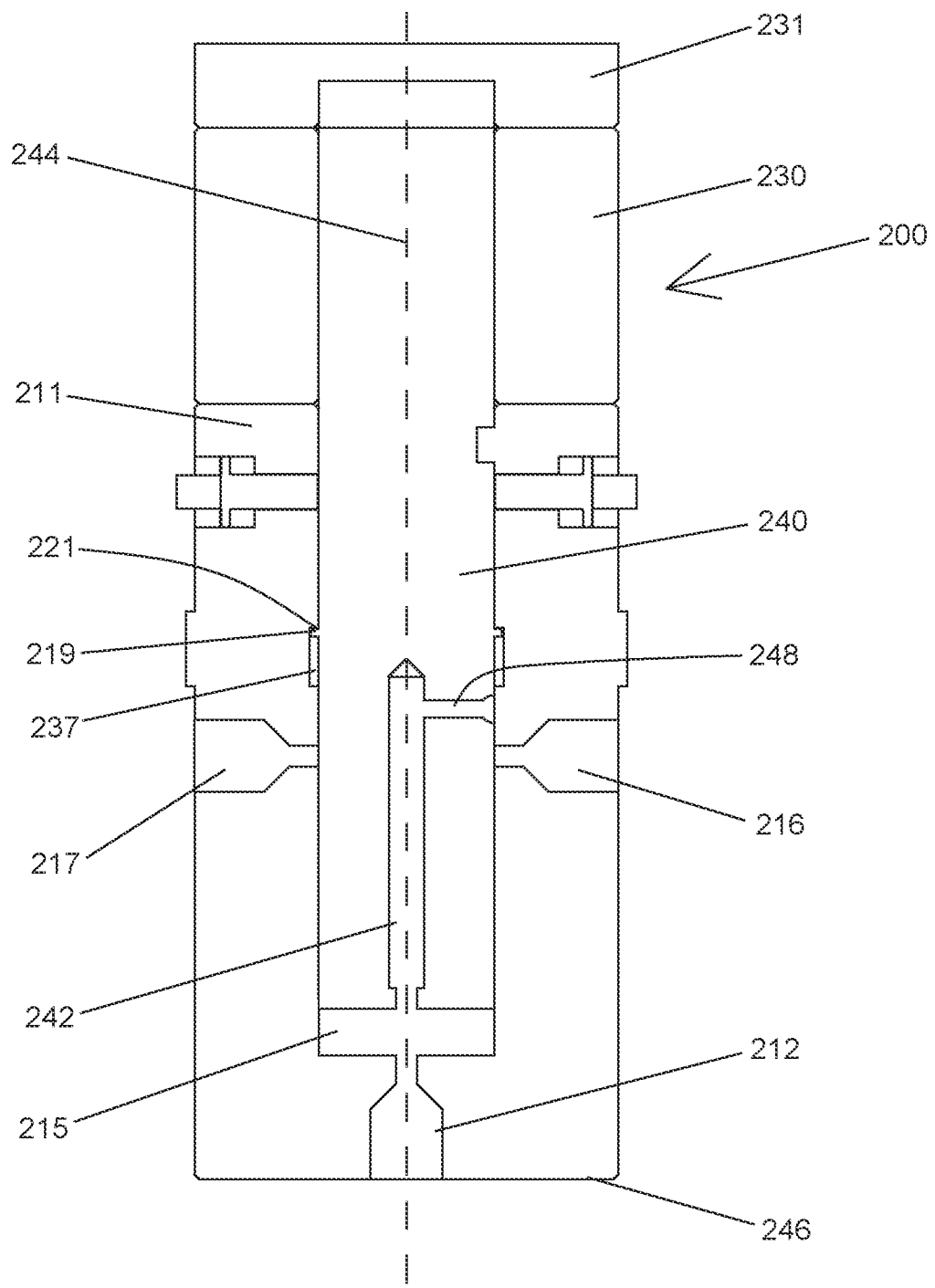
FIG. 11 depicts the rotary multiport valve from FIG. 10 with inner sleeve shifted.

FIG. 11 depicts the rotary multiport valve 200 from FIG. 10 after actuation of linear actuator 231 shifting the inner sleeve from a lower open position where inner sleeve port and flowpath 248 were longitudinally aligned with outer sleeve outlet port 216, to an upper closed position where flowpath 248 is longitudinally offset from outer sleeve outlet port 216. With flowpath 248 shifted upwards to a closed position the rotary actuator 230 may shift flowpath 248 to align with any of the desired ports about the circumference of outer sleeve 211. Once flowpath 248 is aligned with any of the desired ports linear actuator 231 is again actuated to shift the sleeve from the upper closed position to a lower open position such that flowpath 248 may be moved from an open position and alignment with outer sleeve flow port 216 to a closed position and then into alignment with outer sleeve flow port 217 while skipping any intermediate flow ports. Cavity 215 is formed by outer sleeve 211 and inner sleeve 240. The volume of cavity 215 may increase or decrease as inner sleeve 240 is moved longitudinally within outer sleeve 211.

When in use, a fluid supply line is attached to outer sleeve inlet port 212 so that the fluid is able to flow into the interior of the rotary multiport valve 210 where it is then directed to at least one of the outlet ports such as outer sleeve outlet ports 216 or 217. Depending upon which outlet port 216 or 217 the fluid is directed the indicator associated with the outlet port to which the fluid is directed will be actuated. In this case fluid is directed from outer sleeve inlet port 212 through the interior of the rotary multiport valve 200 to outlet port 216. Therefore, indicator 222 is actuated and in this instance indicator 222 is retracted radially inward. In other cases, the indicated may be retracted and only the active indicator is extended.

Figure 12:
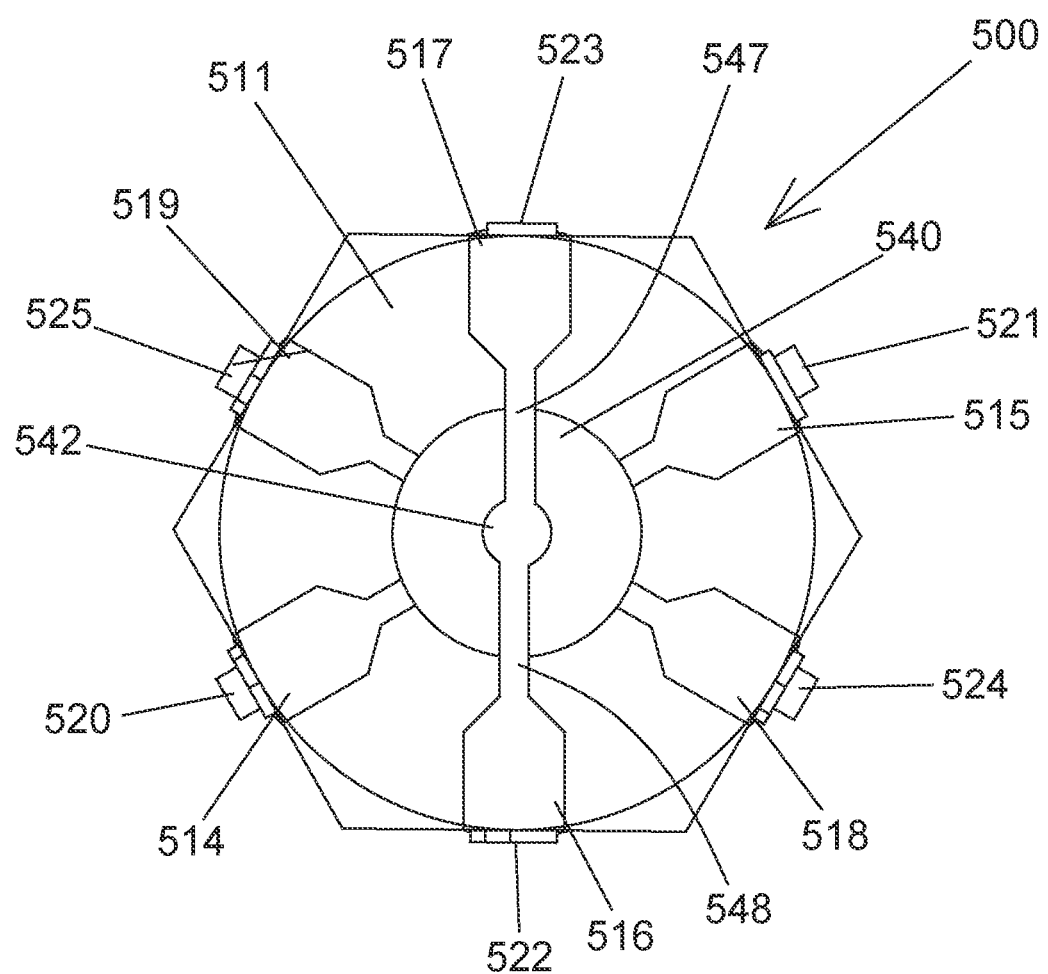
FIG. 12 is a top-down cutaway view of a rotary multiport valve showing an inner sleeve having multiple fluid flowpaths.

FIG. 12 is a top-down cutaway view of a rotary multiport valve 500 showing an inner sleeve 540. The outer sleeve 511 includes at least outer sleeve outlet ports 514, 515, 516, 517, 518, and 519. Within the outer sleeve 511 is inner sleeve 540. Inner sleeve 540 includes a coaxial fluid pathway 542 having multiple radial flow paths, in this case $1^{st}$ flowpath 548 and $2^{nd}$ flowpath 547 formed within inner sleeve 540 that intersect fluid pathway 542. Radial flow paths 548 and 547 are at some point longitudinally aligned with outer sleeve outlet ports 514, 515, 516, 517, 518, and 519 but not necessarily circumferentially aligned with outer sleeve outlet ports 514, 515, 516, 517, 518, and 519. In this case the inner sleeve 540 includes radial flow path 548 and 547 and is aligned so that 2 or more outer sleeve outlet ports, here outer sleeve port 516 and outer sleeve port 517 may be circumferentially and longitudinally aligned to provide at least two open fluid flow pathways at the same time. Additionally, an indicator may be provided for each outer sleeve outlet port to indicate whether the port is an open fluid pathway or closed fluid pathway. Here indicators 520, 521, 522, 523, 524, and 525 are provided. In this instance indicators 520, 521, 524, and 525 are extended radially outward to indicate a closed fluid pathway while indicators 522 and 523 remain recessed to indicate the open fluid pathways between radial flow paths 547 and 548 and outer sleeve outlet ports 517 and 516 respectively.

Figure 13:
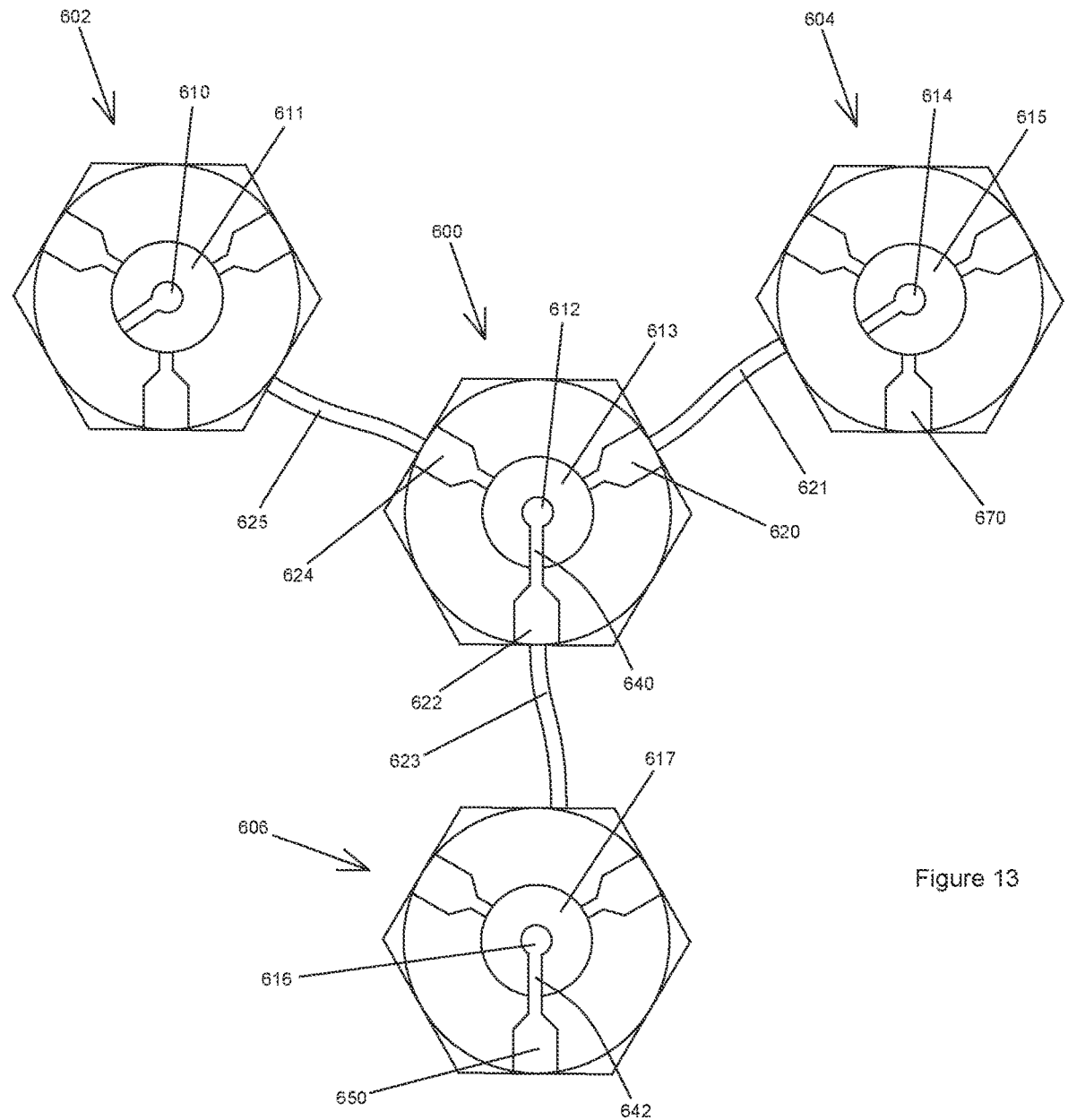
FIG. 13 is a group of rotary multiport valves schematically depicting multiple fluid pathways.

FIG. 13 is a group of rotary multiport valves 600, 602, 604, and 606. Each rotary multiport valve includes an outer sleeve inlet port generally aligned to provide fluid access to the central fluid pathways 610, 612, 614, and 616 of each of the rotary multiport valve 600, 602, 604, and 606 respectively. The outer sleeve inlet port of the central rotary multiport valve 600 is, in this instance connected to a high-pressure fluid supply line. Rotary multiport valve 600 includes 3 outer sleeve outlet ports 620, 622, and 624. Outer sleeve outlet port 620 is connected to a fluid pathway 621 that is in turn connected to outer sleeve inlet port of rotary multiport valve 604. Outer sleeve outlet port 622 is connected to a fluid pathway 623 that is in turn connected to outer sleeve inlet port of rotary multiport valve 606. Outer sleeve outlet port 624 is connected to a fluid pathway 625 that is in turn connected to outer sleeve inlet port of rotary multiport valve 602. With each of rotary multiport valve 600's 3 outer sleeve outlet ports 620, 622, and 624 the inner sleeve 613 of rotor multiport valve 600 may be rotated to provide fluid to the outer sleeve inlet port of any of the rotary multiport valves 602, 604, or 606. In turn each of the inner sleeve's 611, 615, or 617 rotary multiport valve 602, 604, or 606 respectively may be rotated to provide fluid access or to deny fluid access to any of the outer sleeve outlet ports of the rotary multiport valves 602, 604, or 606. For instance, as shown in FIG. 13 is an open fluid pathway where the inner sleeve 613 of rotary multiport valve 600 has been rotated to circumferentially align with outer sleeve outlet port 622 so that fluid may be provided from rotary multiport valve 600s outer sleeve inlet port through the central fluid pathway 612 through the radio fluid pathway 640 the outer sleeve outlet port 622 then through fluid pathway 623 to rotary multiport valve 606 outer sleeve inlet port then through central fluid pathway 616 to radial fluid pathway 642 which is been rotated and a circumferential alignment with outer sleeve outlet port 650. In the configuration shown a single inlet port may be distributed to a possible 9 different outlets. In other configurations more or less outlet configurations are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A rotary greasing valve comprising:
   an outer sleeve having an inlet port and at least 4 radially directed outlet ports, wherein, the inlet port is co-axial with the inner sleeve,
   an inner sleeve having a central fluid pathway, a radially directed fluid pathway, and is rotationally and longitudinally movable within the outer sleeve,
      wherein, upon alignment, a fluid pathway exists between the inner sleeve fluid pathway and at least two of the 4 radially directed outer sleeve outlet ports,
      further wherein a fluid flow pathway does not exist between the inner sleeve fluid pathway and all of the at least 4 radially directed out ports.

\* \* \* \* \*